Patented Dec. 3, 1940

2,223,465

UNITED STATES PATENT OFFICE 2,223,465

COMESTIBLE

Alfred S. Schultz, Bronx, and Charles N. Frey, Scarsdale, N. Y., assignors to Standard Brands Incorporated, New York, N. Y., a corporation of Delaware No Drawing. Application November 28, 1939, Serial No. 306,496

10 Claims. (Cl. 99—96)

The invention relates to a procedure for the production of a comestible, and more particularly to a method whereby the qualities of yeast may be enhanced.

It is an object of the invention to provide a procedure for the preparation of a yeast which comprises associating yeast with a lauric acid derivative, e. g., an ester.

An additional object of the invention is to provide a method of stabilizing, and improving the cutting qualities and color of yeast through the incorporation therewith of a lauric acid partial ester of a polyhydric alcohol, such as lauric acid derivatives of sorbitol and of glycerol.

A specific object of the invention is the provision of a yeast containing a lauric acid derivative such as an ester.

Other objects of the invention will in part be obvious and will in part appear hereinafter.

The invention accordingly comprises the several steps and the relation of one or more of such steps with respect to each of the others, and the composition possessing the features, properties, and the relation of constituents, which are exemplified in the following detailed disclosure, and the scope of the invention will be indicated in the claims.

In the practice of the invention a yeast of improved qualities may be prepared through associating therewith a lauric acid derivative or ester, such as simple esters, i. e., compounds in which the lauryl radical is in combination with a hydrocarbon radical and partial esters of polyhydric alcohols, and more especially those polyhydric alcohols characterized by a carbon atom content of at least three. Association of the lauric acid ester with the yeast may be effected during various stages of its manufacture, or after the manufacture has been completed, and as a finishing feature prior to placement upon the market. Thus, a lauric acid derivative, as a propylene laurate, or a partial ester of a higher polyhydric alcohol, as a laurate of sorbitol, may be admixed before, during or after the growing of yeast.

Preferably, it is combined with yeast after the yeast has been freed from a considerable part of the wort or mother liquor, for example, as the yeast comes from the filter press. It is necessary only to introduce the desired amount of yeast and derivative into a mixer and continue operation until an effective distribution of the derivative has taken place. Thus, a propylene aurate may be incorporated with yeast as it comes from the separators in the cream condition, or after the yeast has been filter pressed and is being prepared for packaging. The polyhydric alcohol may be a glycol, as ethylene, propylene, diethylene, triethylene and dipropylene glycols, glycerol, or a carbohydrate alcohol as sorbitol, mannitol, erythrol and the like.

Further, it is believed that the lauric acid derivative or ester may be represented by the following probable formula:

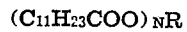

in which N is an integer and R represents a hydrocarbon radical which may be saturated or unsaturated, as methyl, ethyl, propyl, butyl, amyl, a radical resulting through the removal of one atom of hydrogen from ethylene, propylene, butylene, and the like, and an esterification residue as that from ethylene glycol —$CH_2CH_2OH$; diethylene glycol —$CH_2.CH_2.O.CH_2.CH_2OH$; and glycerol —$CH_2.CHOH.CH_2OH$, and the like. Specifically, the lauric acid ester may be ethyl laurate, propylene laurate, ethylene glycol monolaurate, propylene glycol monolaurate, glycerol monolaurate, and disorbitol laurate, having, respectively, the following formulae, in which X represents the lauryl radical ($C_{11}H_{23}COO$—):

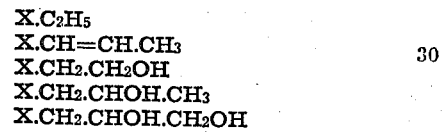

The combination with yeast may be and preferably is brought about by admixture with the yeast after it has been filter pressed, and satisfactory results have been obtained through the use of from 0.12 to about 1% of the lauric acid derivative. A yeast so produced is thereby stabilized and possesses improved cutting qualities, and hence may be carried through the various operations attending the cutting and wrapping with greater facility.

Moreover, it is of improved color, i. e., whiter than without the incorporation of a lauric acid derivative. We have found that propylene laurate, glyceryl monolaurate and the mono-, di- and/or trilaurate of sorbitol are particularly well adapted for incorporation in yeast in order to improve the cutting and to give a whiter color, and there appears also to be an increase in the water holding capacity of the yeast, with a resultant cake which is firm and of lighter color.

The procedure accordingly leads to the obtainment of a yeast that is stabilized and has improved qualities. It is considered that compounds of distinct effectiveness are propylene laurate, glyceryl laurate, and a dilaurate of sorbitol, as a dilaurate-disorbitol, having the probable formula

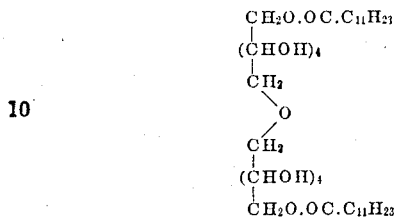

The lauric acid derivatives may be utilized either singly, or in compatible combinations.

This application is in part a continuation of our copending application Serial No. 150,536, filed June 26, 1937.

Since certain changes in carrying out the above process and certain modifications in the composition which embody the invention may be made without departing from its scope, it is intended that all matter contained in the above description shall be interpreted as illustrative and not in a limiting sense.

Having described our invention, what we claim as new and desire to secure by Letters Patent is:

1. As an article of manufacture a yeast associated with a lauric acid ester having the probable general formula $(C_{11}H_{23}COO)_N R$ wherein N is an integer and R represents a hydrocarbon radical which may be saturated or unsaturated and an esterification residue, as a stabilizing agent for said yeast.

2. As an article of manufacture a yeast associated with a lauric acid ester of a polyhydric alcohol as a stabilizing agent for said yeast.

3. As an article of manufacture a yeast associated with a lauric acid partial ester of a polyhydric alcohol as a stabilizing agent.

4. As an article of manufacture a yeast associated with a lauric acid ester of a glycol as a stabilizing agent.

5. As an article of manufacture a yeast associated with a lauric acid ester of propylene glycol as a stabilizing agent.

6. As an article of manufacture a yeast associated with propylene glycol monolaurate as a stabilizing agent for said yeast.

7. As an article of manufacture a yeast associated with a lauric acid ester of glycerol as a stabilizing agent for said yeast.

8. As an article of manufacture a yeast associated with a lauric acid partial ester of glycerol as a stabilizing agent for said yeast.

9. As an article of manufacture a yeast associated with glycerol monolaurate as a stabilizing agent for said yeast.

10. As an article of manufacture a yeast associated with propylene laurate of the probable formula $C_{11}H_{23}COOCH=CH.CH_3$ as a stabilizing agent for said yeast.

ALFRED S. SCHULTZ.
CHARLES N. FREY.